United States Patent
Huntzicker (10) Patent No.: US 9,280,826 B2
(45) Date of Patent: Mar. 8, 2016

(54) DISTANCE DETERMINATION USING A MONOSCOPIC IMAGER IN A VEHICLE

(71) Applicant: GM GLOBAL TECHNOLOGY OPERATIONS LLC, Detroit, MI (US)

(72) Inventor: Fred W. Huntzicker, Ann Arbor, MI (US)

(73) Assignee: GM GLOBAL TECHNOLOGIES OPERATIONS LLC, Detroit, MI (US)

( * ) Notice: Subject to any disclaimer, the term of this patent is extended or adjusted under 35 U.S.C. 154(b) by 265 days.

(21) Appl. No.: 14/101,410

(22) Filed: Dec. 10, 2013

(65) Prior Publication Data

US 2015/0161795 A1    Jun. 11, 2015

(51) Int. Cl.
| | |
|---|---|
| H04N 7/18 | (2006.01) |
| G05D 1/00 | (2006.01) |
| G05D 3/00 | (2006.01) |
| G06T 7/00 | (2006.01) |
| G06K 9/00 | (2006.01) |
| H04N 5/247 | (2006.01) |
| G06F 7/00 | (2006.01) |
| G06F 17/00 | (2006.01) |
| G01C 22/00 | (2006.01) |

(52) U.S. Cl.
CPC .......... *G06T 7/0044* (2013.01); *G06K 9/00805* (2013.01); *G06K 9/00812* (2013.01); *H04N 5/247* (2013.01); *G06T 2207/30261* (2013.01); *G06T 2207/30264* (2013.01)

(58) Field of Classification Search
CPC ............. H04N 7/18; G05D 1/00; G05D 3/00; G06F 7/00; G06F 17/00; G01C 22/00; B60R 22/00; E05F 15/00; F41G 1/00
USPC ....................................... 348/136, 61, 64, 118
See application file for complete search history.

(56) References Cited

U.S. PATENT DOCUMENTS

| | | | | |
|---|---|---|---|---|
| 5,155,683 | A * | 10/1992 | Rahim ............................. | 701/25 |
| 2002/0049530 | A1* | 4/2002 | Poropat ......................... | 701/207 |
| 2010/0259372 | A1* | 10/2010 | Hideshiro ...................... | 340/435 |

* cited by examiner

*Primary Examiner* — Daquan Zhao
(74) *Attorney, Agent, or Firm* — Cantor Colburn LLP (57) ABSTRACT

According to one aspect, a distance determination system for a vehicle includes a monoscopic imager, and a distance determination module in communication with the monoscopic imager and configured to receive vehicle position data. The distance determination module includes a vehicle position determination sub-module configured to determine a first and second position of the vehicle based on the vehicle position data. A feature identification sub-module is configured to capture a first image at the first position using the monoscopic imager, capture a second image at the second position using the monoscopic imager, identify at least one feature in the first image, and identify the at least one feature in the second image. A distance estimation sub-module is configured to determine a difference between the first and second position of the vehicle, identify a difference in position of the at least one feature, and determine an estimated distance.

20 Claims, 5 Drawing Sheets

DISTANCE DETERMINATION USING A MONOSCOPIC IMAGER IN A VEHICLE

FIELD OF THE INVENTION

Exemplary embodiments of the invention relate to a distance determination system and, more particularly, to a distance determination system using a monoscopic imager in a vehicle.

BACKGROUND

Distance determination systems that provide a distance estimate between a vehicle and an object can be useful in a number of situations. As one example, parking in a relatively small garage or parking space may be challenging for some individuals. Incorrectly parking a vehicle in a confined garage space may result in damage to the vehicle body (e.g., caused by a garage door, another vehicle, or another obstruction). Park assist systems are used to indicate obstacles located in front of or behind a vehicle during parking. As one example, a vehicle may include one or more ultrasonic sensors that can be used to provide a distance estimate between the vehicle and an object or surface. While such ultrasonic sensor based systems can be useful relative to a large object or surface, they may have difficulty in detecting a smaller object such as a handle or branch in proximity to the vehicle.

As another example, some types of park assist systems include an imaging device such as a camera that is mounted to a front portion or a rear portion of the vehicle. The camera acquires image data that represents a viewable area either in front of or behind the vehicle. The park assist system may then provide feedback to the driver to indicate how to maneuver the vehicle into a garage or parking space.

Stereoscopic camera-based systems can be used to capture multiple images at the same time from multiple cameras and make distance estimates based on known angles and displacement of the cameras relative to a targeted object in the image fields of the cameras. Stereoscopic cameras typically require precise timing relative to each other. Stereoscopic camera-based systems may not function correctly if one of the cameras is obstructed or damaged. The inclusion of multiple cameras and associated interfaces in a stereoscopic camera-based system also adds to overall vehicle cost.

Accordingly, it is desirable to provide an improved distance determination system which exhibits accurate distance estimation relative to variously sized objects while keeping associated hardware costs low.

SUMMARY OF THE INVENTION

In one exemplary embodiment of the invention, a distance determination system for a vehicle includes a monoscopic imager configured to acquire image data representative of a field of view from the vehicle, and a distance determination module in communication with the monoscopic imager and configured to receive vehicle position data. The distance determination module includes a vehicle position determination sub-module configured to determine a first position of the vehicle based on the vehicle position data at a first time and determine a second position of the vehicle based on the vehicle position data at a second time. The first position of the vehicle is different from the second position of the vehicle. A feature identification sub-module is configured to capture a first image at the first position of the vehicle using the monoscopic imager, capture a second image at the second position of the vehicle using the monoscopic imager, identify at least one feature in the first image, and identify the at least one feature in the second image. A distance estimation sub-module is configured to determine a difference between the first position and the second position of the vehicle, identify a difference in position of the at least one feature between the first image and the second image, and determine an estimated distance between the vehicle and the at least one feature based on the difference between the first position and the second position of the vehicle and the identified difference in the position of the at least one feature between the first image and the second image.

According to another embodiment, a method of distance determination using a monoscopic imager in a vehicle is provided. A first position of the vehicle is determined based on vehicle position data at a first time. A second position of the vehicle is determined based on the vehicle position data at a second time. The first position of the vehicle is different from the second position of the vehicle. A first image is captured at the first position of the vehicle using the monoscopic imager. A second image is captured at the second position of the vehicle using the monoscopic imager. At least one feature is identified in the first image. The at least one feature is identified in the second image. A difference between the first position and the second position of the vehicle is determined. A difference in position of the at least one feature are identified between the first image and the second image. An estimated distance between the vehicle and the at least one feature is determined based on the difference between the first position and the second position of the vehicle and the identified difference in the position of the at least one feature between the first image and the second image.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its application or uses. It should be understood that throughout the drawings, corresponding reference numerals indicate like or corresponding parts and features. As used herein, the terms module and sub-module refer to processing circuitry that may include an application specific integrated circuit (ASIC), an electronic circuit, a processor (shared, dedicated, or group)

and memory that executes one or more software or firmware programs, a combinational logic circuit, and/or other suitable components that provide the described functionality.

Figure 1:
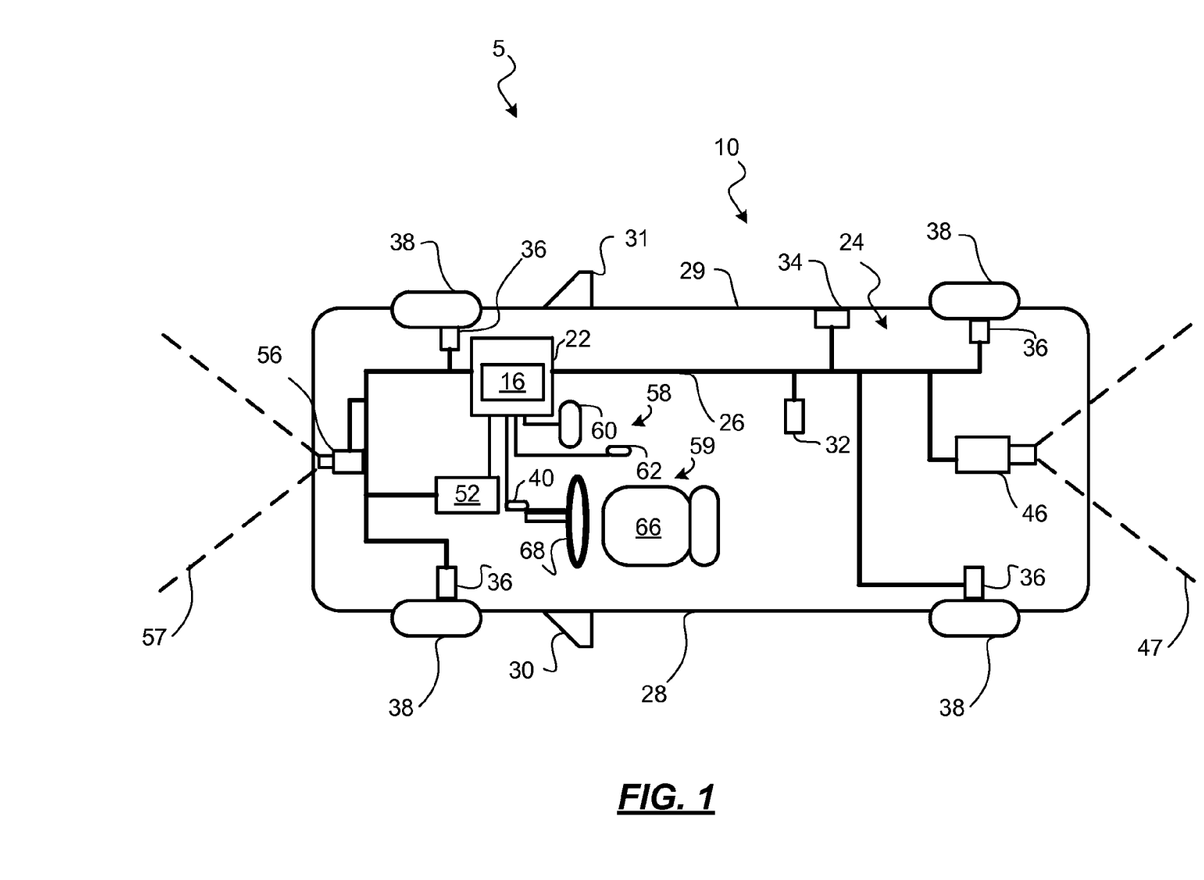
FIG. 1 is an illustration of an exemplary distance determination system in a vehicle.

In accordance with an exemplary embodiment of the invention a distance determination system 5 is shown generally as part of a vehicle 10 in FIG. 1. The vehicle 10 can be any ground-based vehicle, such as an automobile, truck, or the like, for example. The distance determination system 5 includes a distance determination module 16 which may be integrated with or in communication with a park assist control module 22. The park assist control module 22 is configured to interface with a plurality of vehicle systems 24 using a vehicle communication network 26. The park assist control module 22 may interface directly with the distance determination module 16 or may communicate with the distance determination module 16 via the vehicle communication network 26. The vehicle communication network 26 can include a number of interfaces and communication links. For example, the park assist control module 22 may interface with an acceleration sensor 32, a yaw sensor 34, a plurality of wheel sensors 36 of road wheels 38, a steering angle sensor 40, a rear-facing monoscopic imager 46, a front-facing monoscopic imager 56, and other vehicle sensor systems known in the art. The park assist control module 22 can derive a variety of values based on the received signals, such as a vehicle velocity and position defined in up to six axes. One or more of the sensors 32, 34, 36, and 40 may interface with the park assist control module 22 over the vehicle communication network 26 or can be provided indirectly via another module, such as a stability control module 52. In one embodiment, the stability control module 52 determines the position of the vehicle 10 in up to six axes and accounts for slippage of one or more of the road wheels 38 in making position determinations. The wheel sensors 36 may be rotary encoders with a granularity of about four degrees, where wheel position data from the wheel sensors 36 can be translated into a linear position/displacement. The steering angle sensor 40 can produce a steering angle relative to the road wheels 38 and/or a current position of a vehicle steering wheel 68.

The rear-facing monoscopic imager 46 acquires image data regarding a rear viewable area or field of view (FOV) 47. The front-facing monoscopic imager 56 acquires image data regarding a front viewable area or FOV 57. The rear-facing monoscopic imager 46 and front-facing monoscopic imager 56 may each comprise a single lens, non-stereographic camera, where the FOV 47 does not overlap with the FOV 57. The distance determination system 5 may also include other monoscopic imagers to capture other fields of view (not depicted). For example, one or more monoscopic imagers can be installed on a driver side 28 of the vehicle 10, e.g., integrated with a driver-side mirror 30. Additionally, one or more monoscopic imagers can be installed on a passenger side 29 of the vehicle 10, e.g., integrated with a passenger-side mirror 31. Rather than rely upon overlapping fields of view as is typically performed for stereoscopic based systems, exemplary embodiments acquire a plurality of images for a given monoscopic imager and correlate relative position changes of identified features in the images with changes in a position of the vehicle 10. In another embodiment, multiple monoscopic imagers are positioned in a stereoscopic arrangement forming a partially-overlapped combined field of view, and the distance determination module 16 is operable on non-overlapping portions of the combined field of view.

The park assist control module 22 may also interface with a variety of input/output devices 58 in a cabin 59 of the vehicle 10, such as a user interface 60 and a transmission gear selector 62. The input/output devices 58 are located proximate to a vehicle operator position 66. The user interface 60 may be a touch-screen based system or other non-touch display system with associated inputs, such as buttons. The transmission gear selector 62 may be used to select which monoscopic imager to use for distance estimation. For example, when the transmission gear selector 62 is in reverse, the rear-facing monoscopic imager 46 can be used for distance estimation, while the front-facing monoscopic imager 56 can be used for distance estimation when the transmission gear selector 62 is in a forward drive setting/gear.

Figure 2:
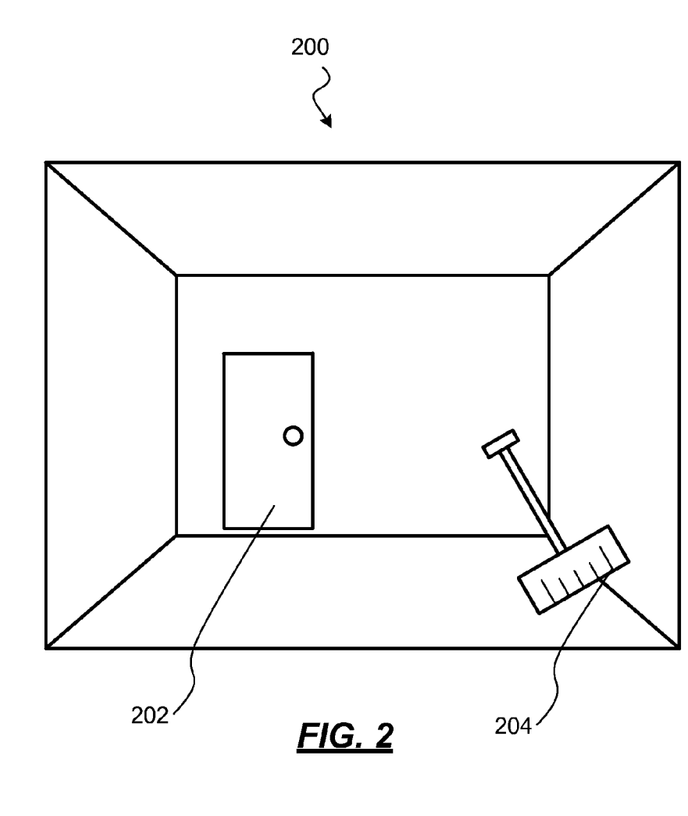
FIGS. 2 and 3 are examples of a first image and a second image including at least one feature in common.
Figure 3:
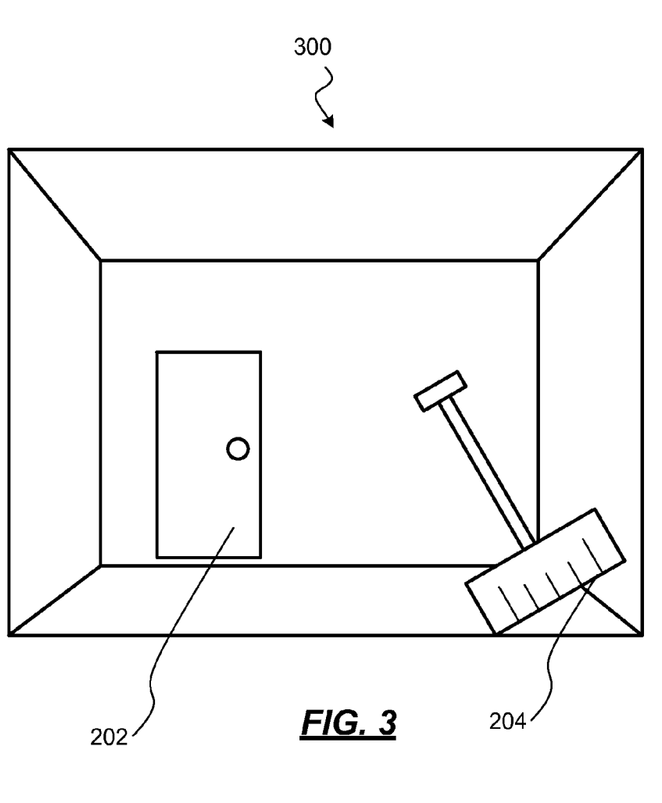

FIGS. 2 and 3 are examples of a first image 200 and a second image 300 including at least one feature in common, where the first image 200 and second image 300 are captured by a same monoscopic imager. For instance, the first image 200 and the second image 300 may both be captured by the front-facing monoscopic imager 56 of FIG. 1 at different times when the vehicle 10 of FIG. 1 is located at two different positions. A first feature 202, such as a door, and a second feature 204, such as a snow shovel, may be identified by the distance estimation module 16 of FIG. 1. Based on differences in position on the images 200 and 300 in combination with a determined change in position of the vehicle 10 of FIG. 1, estimated distances between the vehicle 10 of FIG. 1 and the first feature 202 and between the vehicle 10 and the second feature 204 can be determined. One or more estimated distances can be displayed on the user interface 60 of FIG. 1. Overlays with color coding, for example, can be used to identify features on the user interface 60 of FIG. 1 at closer estimated distances to the vehicle 10. The features 202 and 204 can be approximations of entire objects or a portion of an object or surface that is tracked between the images 200 and 300 (e.g., a door knob or shovel handle).

Figure 4:
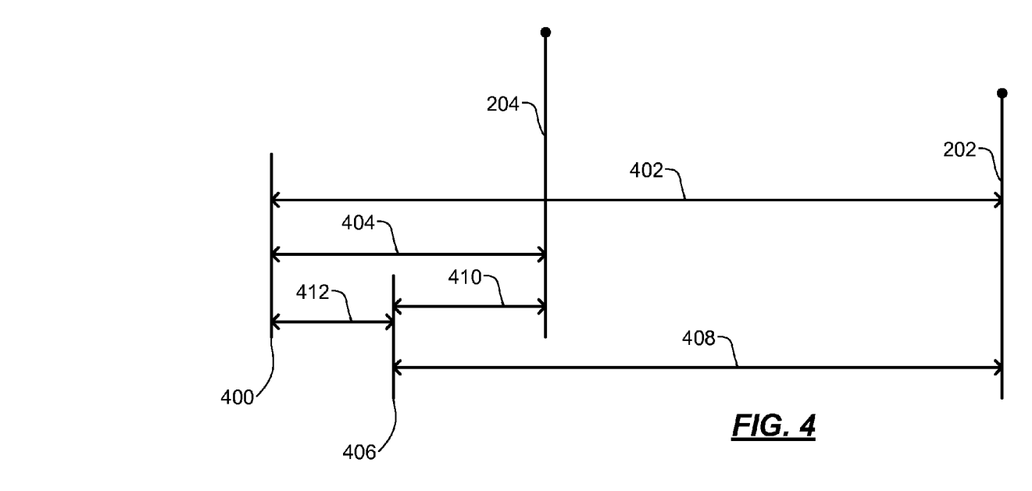
FIG. 4 is an illustration of relative differences in distances to features based on a change in position.

FIG. 4 is an illustration of relative differences in distances to features based on a change in position with continued reference to FIGS. 1-3. When the vehicle 10 of FIG. 1 is at a first position 400, a first distance 402 exists between the first position 400 and the first feature 202, and a second distance 404 exists between the first position 400 and the second feature 204. When the vehicle 10 of FIG. 1 moves to a second position 406, a third distance 408 exists between the second position 406 and the first feature 202, and a fourth distance 410 exists between the second position 406 and the second feature 204. The first position 400 and second position 406 may be defined in terms of the vehicle 10 of FIG. 1 as a furthest protruding point based on a direction of travel, e.g., a front bumper when going forward and a rear bumper when going in reverse.

As can be seen in FIG. 4, moving between the first position 400 and the second position 406 has the greatest apparent effect on the second feature 204 as it is closer to the vehicle 10 of FIG. 1. For example, the third distance 408 may be about 80% of the first distance 402, which can make the first feature 202 appear about 25% larger (i.e., $1/0.8$) at the second position 406 relative to the first position 400. In contrast, the fourth distance 410 may be about half of the second distance 404, which can make the second feature 204 appear about twice its size (i.e., $1/0.5$) at the second position 406 relative to the first position 400. When a difference in position 412 between the first position 400 and the second position 406 of the vehicle 10 of FIG. 1 is determined based on the vehicle position data, the difference in position 412 of at least one feature, such as features 202 and 204 between multiple images, such as images 200 and 300 of FIGS. 2 and 3, can be used in determining distance estimates. These calculations and comparisons can be extended in multiple dimensions.

Figure 5:
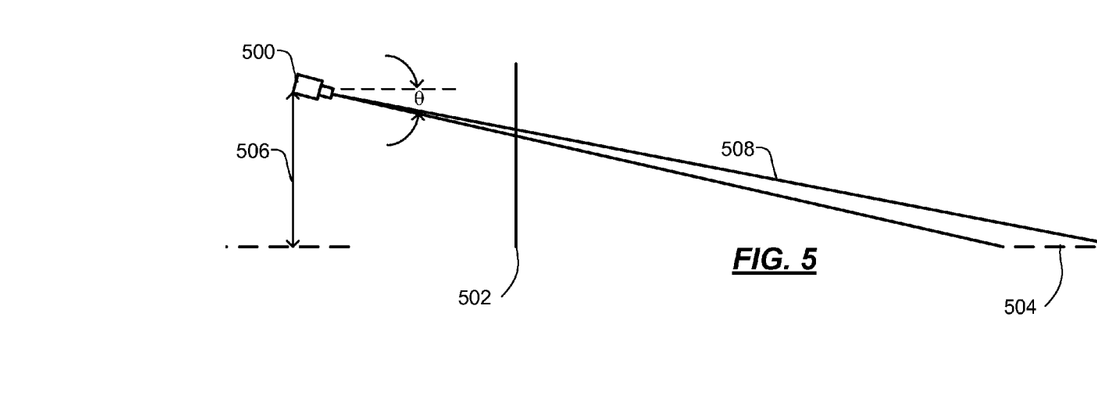
FIG. 5 is an illustration of a monoscopic imager position relative to an image plane and a horizontal surface.

FIG. 5 is an illustration of a monoscopic imager position 500 relative to an image plane 502 and a horizontal surface

504. The monoscopic image position 500 can be defined for each monoscopic imager of the vehicle 10 of FIG. 1, such as the rear-facing monoscopic imager 46 and front-facing monoscopic imager 56 of FIG. 1. The monoscopic imager position 500 can be defined at a height 506 and an angle Θ relative to the horizontal surface 504. As features appear to move within a FOV 508 based on movement of the vehicle 10 of FIG. 1, the features, such as features 202 and 204 of FIGS. 2-4, appear to move in images captured at different vehicle positions. For example, movement of a feature relative to the horizontal surface 504 in the FOV 508 translates into positional movement in the image plane 502, and thus in respective images captured at different positions, such as positions 400 and 406 of FIG. 4. These relationships in combination with the relationships described in reference to FIG. 4 and known image processing techniques enable distance estimation in exemplary embodiments. In one embodiment, a scale-invariant feature transform is used to locate at least one feature in multiple images and determine a difference in position of the at least one feature between the images. Differences in apparent rescaling of features between multiple images can also be used in determining or confirming distance estimates, e.g., determining a percentage increase or decrease in apparent feature size between images. As one example, a change of position without a change in scaling of a feature may indicate independent movement of the feature.

Figure 6:
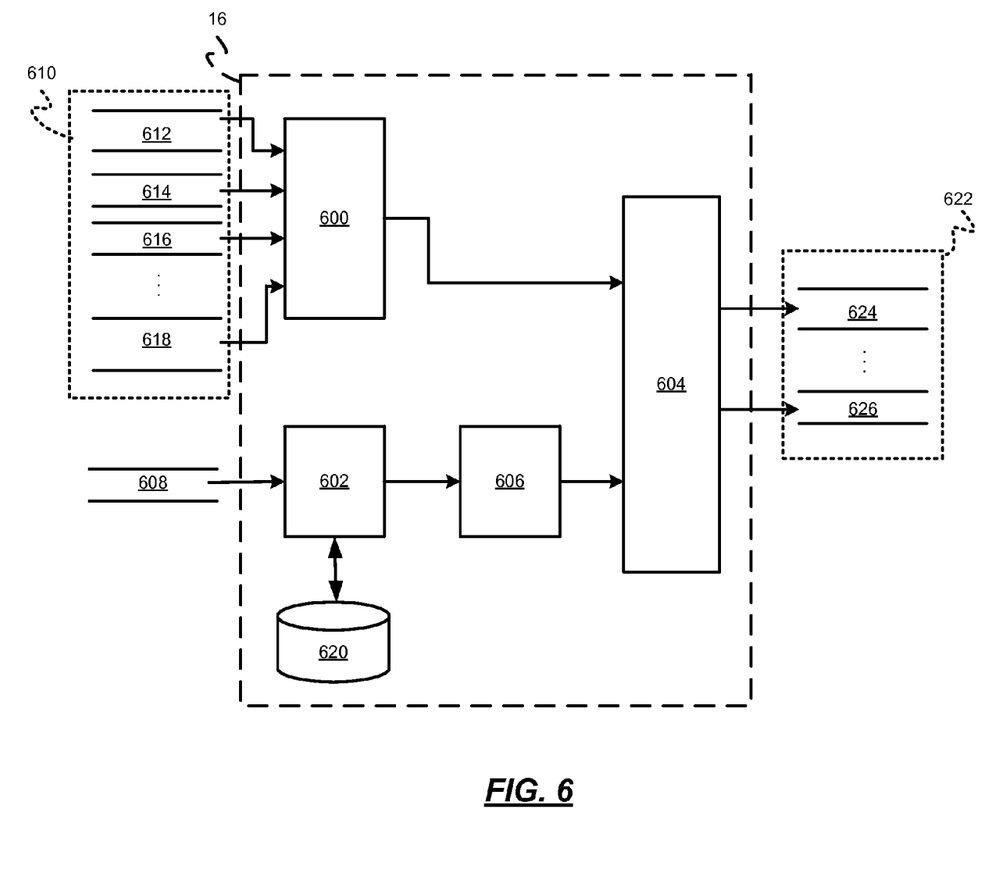
FIG. 6 is a dataflow diagram for a distance determination module.

FIG. 6 is a dataflow diagram for the distance determination module 16 of FIG. 1 according to an embodiment and described in reference to FIGS. 1-4. Various embodiments of distance determination module 16 according to the present disclosure may include any number of modules. As can be appreciated, the modules shown in FIG. 6 may be combined and/or further partitioned to similarly perform distance determination processing. Inputs to the distance determination module 16 may be sensed directly from the vehicle 10 of FIG. 1, received from other modules within the vehicle 10 of FIG. 1, for example, via the vehicle communication network 26 of FIG. 1, and/or determined/modeled by other modules, such as the park assist control module 22 and/or stability control module 52 of FIG. 1. In the example of FIG. 6, the distance determination module 16 includes a vehicle position determination sub-module 600, a feature identification sub-module 602, and a distance estimation sub-module 604. The distance determination module 16 may also include a filtering sub-module 606.

The distance determination module 16 is in communication with one or more monoscopic imagers, such as rear-facing monoscopic imager 46 and front-facing monoscopic imager 56 of FIG. 1, where each monoscopic imager is configured to acquire image data 608 representative of a field of view from the vehicle 10 of FIG. 1. The image data 608 can include multiple images from a selected monoscopic imager. The distance determination module 16 is also configured to receive vehicle position data 610, which may include at least one wheel position 612 based on at least one of the wheel sensors 36 of FIG. 1, a steering angle 614 based on the steering angle sensor 40 of FIG. 1, a yaw 616 based on the yaw sensor 34 of FIG. 1, and an acceleration 618 based on the acceleration sensor 32 of FIG. 1. Other values that assist in defining position of the vehicle 10 of FIG. 1 can also be included in the vehicle position data 610.

In an exemplary embodiment, the vehicle position determination sub-module 600 is configured to determine the first position 400 of FIG. 4 of the vehicle 10 of FIG. 1 based on the vehicle position data 610 at a first time. The vehicle position determination sub-module 600 is also configured to determine the second position 406 of FIG. 4 of the vehicle 10 of FIG. 1 based on the vehicle position data 610 at a second time, where the first position 400 of the vehicle 10 is different from the second position 406 of the vehicle 10.

The feature identification sub-module 602 is configured to capture a first image 200 at the first position 400 of the vehicle 10 using a monoscopic imager, such as rear-facing monoscopic imager 46 or front-facing monoscopic imager 56 of FIG. 1. The feature identification sub-module 602 is further configured to capture a second image 300 at the second position 406 of the vehicle 10 using the monoscopic imager. The feature identification sub-module 602 can identify at least one feature 202, 204 in the first image 200, and identify the at least one feature 202, 204 in the second image 300. The feature identification sub-module 602 can access a feature identification database 620 that may hold feature definitions or pixel grouping patterns for searching the image data 608. Additionally, the feature identification database 620 may support a training mode where new pixel grouping patterns are added or learned based on a training procedure using, for example, scale-invariant feature transform methods known in the art. Identification of features can be performed using techniques known in the art, such as pixel grouping pattern identification.

The distance estimation sub-module 604 is configured to determine a difference between the first position 400 and the second position 406 of the vehicle 10. The first position 400 of the vehicle 10 and the second position 406 of the vehicle 10 may be defined in six axes, and the at least one feature 202, 204 can be identified in at least two axes. The distance estimation sub-module 604 can identify any differences in position of the at least one feature 202, 204 between the first image 200 and the second image 300. The distance estimation sub-module 604 can determine estimated distances 622 between the vehicle 10 and the at least one feature 202, 204 based on the difference between the first position 400 and the second position 406 (FIG. 4) of the vehicle 10 (FIG. 1) and any identified differences in the position of the at least one feature 202, 204 between the first image 200 and the second image 300 (FIGS. 2-3). The estimated distances 622 can be calculated separately for each of two or more features. For example, an estimated distance 624 may be associated with feature 202, and an estimated distance 626 can be associated with feature 204.

The feature identification sub-module 602 may be further configured to acquire at least three images using the monoscopic imager. The filtering sub-module 606 can be configured to perform position filtering of the at least one feature 202, 204 based on the at least three images. At least two of the at least three images may be acquired at a same position of the vehicle 10, e.g., two images at position 400 of FIG. 4. The filtering may be performed as combination of time-based and rationality-based filtering. In time-based filtering, multiple images taken at about the same time or from about the same vehicle position can be averaged, or outliers can be removed to reduce noise. For instance, the filtering can include averaging at least a pair of images at the first position 400 of the vehicle 10 and at least a pair of images at the second position 406 of the vehicle 10. In rationality-based filtering, more complex transfer functions can be applied to sharpen or remove noise from the images. Additionally, basic checks can be performed to ensure that an identified feature is behaving within expected bounds, such as not moving too quickly independent of the vehicle 10.

Figure 7:
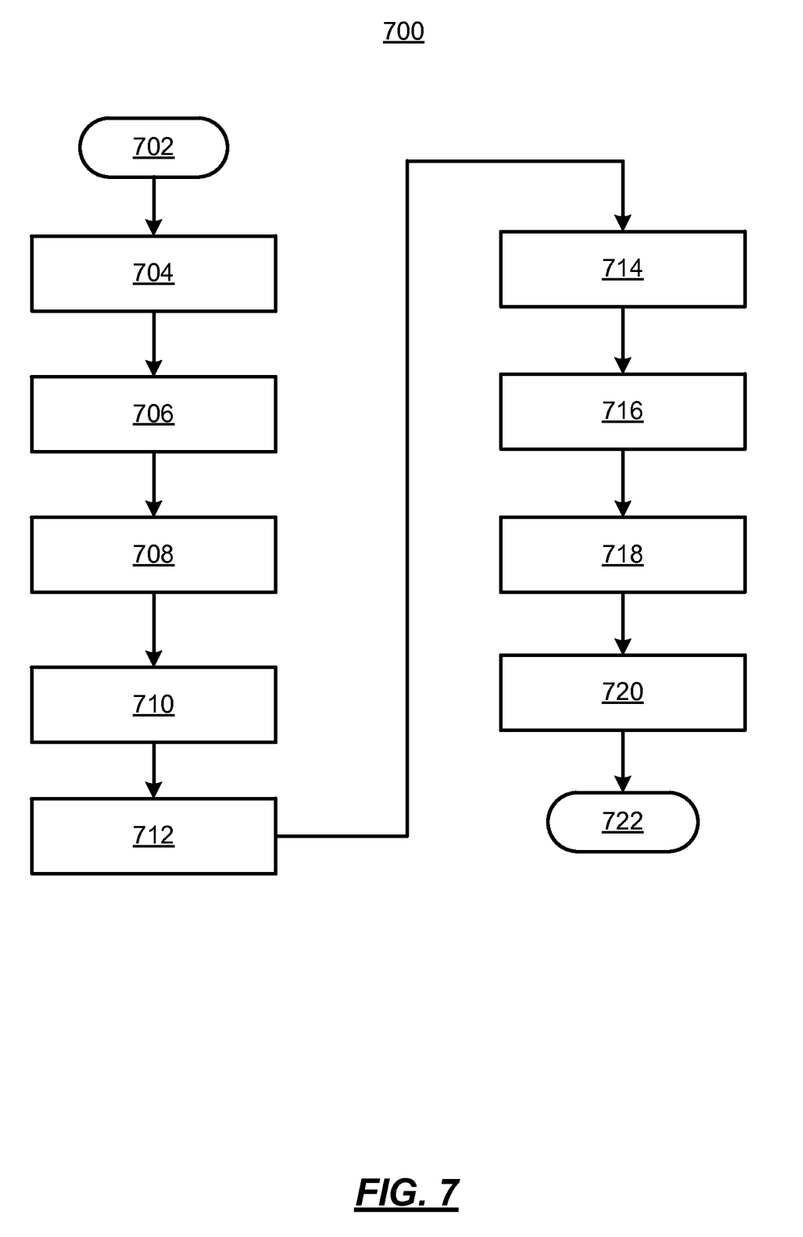
FIG. 7 is a process flow diagram illustrating a method of distance determination using a monoscopic imager in a vehicle.

FIG. 7 is an exemplary process flow diagram illustrating a method 700 for distance determination for the vehicle 10 of FIG. 1. Accordingly, the method 700 is described in reference to FIGS. 1-7. As can be appreciated in light of the disclosure, the order of operations within the method 700 is not limited to the sequential execution as illustrated in FIG. 7, but may be performed in one or more varying orders as applicable and in accordance with the present disclosure. As can further be appreciated, one or more steps may be added or removed without altering the spirit of the method.

Method 700 begins at block 702 and can be performed periodically when distance determination is enabled. At step 704, a first position 400 of the vehicle 10 is determined based on vehicle position data 610 at a first time. At step 706, a second position 406 of the vehicle 10 is determined based on the vehicle position data 610 at a second time. The first position 400 of the vehicle 10 is different from the second position 406 of the vehicle 10. At step 708, a first image 200 is captured at the first position 400 of the vehicle 10 using a monoscopic imager, such as the rear-facing monoscopic imager 46 or the front-facing monoscopic imager 56. At step 710, a second image 300 is captured at the second position 406 of the vehicle 10 using the monoscopic imager. At step 712, at least one feature 202, 204 is identified in the first image 200. At step 714, the at least one feature 202, 204 is identified in the second image 300. At step 716, a difference between the first position 400 and the second position 406 of the vehicle 10 is determined. At step 718, a difference in position of the at least one feature 202, 204 between the first image 200 and the second image 300 is identified. At step 720, an estimated distance 624, 626 is determined between the vehicle 10 and the at least one feature 202, 204 based on the difference between the first position 400 and the second position 406 of the vehicle 10 and the identified difference in the position of the at least one feature 202, 204 between the first image 200 and the second image 300. Additional images can be captured at each position 400, 406 or in close proximity thereto such that filtering may be applied to reduce noise effects and other inconsistencies. The method 700 ends at 722.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A distance determination system for a vehicle, the distance determination system comprising:
   a monoscopic imager configured to acquire image data representative of a field of view from the vehicle; and
   a distance determination module in communication with the monoscopic imager and configured to receive vehicle position data, the distance determination module comprising:
      a vehicle position determination sub-module configured to determine a first position of the vehicle based on the vehicle position data at a first time and determine a second position of the vehicle based on the vehicle position data at a second time, the first position of the vehicle different from the second position of the vehicle;
      a feature identification sub-module configured to capture a first image at the first position of the vehicle using the monoscopic imager, capture a second image at the second position of the vehicle using the monoscopic imager, identify at least one feature in the first image, and identify the at least one feature in the second image; and
      a distance estimation sub-module configured to determine a difference between the first position and the second position of the vehicle, identify a difference in position of the at least one feature between the first image and the second image, and determine an estimated distance between the vehicle and the at least one feature based on the difference between the first position and the second position of the vehicle and the identified difference in the position of the at least one feature between the first image and the second image.

2. The distance determination system of claim 1, wherein the feature identification sub-module is further configured to acquire at least three images using the monoscopic imager, and the distance determination module further comprises a filtering sub-module configured to perform position filtering of the at least one feature based on the at least three images.

3. The distance determination system of claim 2, wherein the filtering performed by the filtering sub-module is a combination of time-based and rationality-based filtering.

4. The distance determination system of claim 2, wherein at least two of the at least three images are acquired at a same position of the vehicle.

5. The distance determination system of claim 2, wherein the filtering further comprises averaging at least a pair of images at the first position of the vehicle and at least a pair of images at the second position of the vehicle.

6. The distance determination system of claim 1, wherein the vehicle position data comprises at least one wheel position based on at least one wheel sensor of the vehicle.

7. The distance determination system of claim 1, wherein the vehicle position data comprises a steering angle of the vehicle.

8. The distance determination system of claim 1, wherein the vehicle position data comprises a yaw and an acceleration of the vehicle.

9. The distance determination system of claim 1, wherein the first position of the vehicle and the second position of the vehicle are defined in six axes, and the at least one feature is identified in at least two axes.

10. The distance determination system of claim 1, wherein the distance determination module is further configured to provide separate distance estimates for two or more features identified in the first and second images.

11. A method of distance determination using a monoscopic imager in a vehicle, the method comprising:
  determining a first position of the vehicle based on vehicle position data at a first time;
  determining a second position of the vehicle based on the vehicle position data at a second time, the first position of the vehicle different from the second position of the vehicle;
  capturing a first image at the first position of the vehicle using the monoscopic imager;
  capturing a second image at the second position of the vehicle using the monoscopic imager;
  identifying at least one feature in the first image;
  identifying the at least one feature in the second image;
  determining a difference between the first position and the second position of the vehicle;
  identify a difference in position of the at least one feature between the first image and the second image; and
  determining an estimated distance between the vehicle and the at least one feature based on the difference between the first position and the second position of the vehicle and the identified difference in the position of the at least one feature between the first image and the second image.

12. The method of claim 11, further comprising:
  acquiring at least three images using the monoscopic imager; and
  performing position filtering of the at least one feature based on the at least three images.

13. The method of claim 12, wherein the filtering is a combination of time-based and rationality-based filtering.

14. The method of claim 12, wherein at least two of the at least three images are acquired at a same position of the vehicle.

15. The method of claim 12, wherein the filtering further comprises averaging at least a pair of images at the first position of the vehicle and at least a pair of images at the second position of the vehicle.

16. The method of claim 11, wherein the vehicle position data comprises at least one wheel position based on at least one wheel sensor of the vehicle.

17. The method of claim 11, wherein the vehicle position data comprises a steering angle of the vehicle.

18. The method of claim 11, wherein the vehicle position data comprises a yaw and an acceleration of the vehicle.

19. The method of claim 11, wherein the first position of the vehicle and the second position of the vehicle are defined in six axes, and the at least one feature is identified in at least two axes.

20. The method of claim 11, further comprising:
  providing separate distance estimates for two or more features identified in the first and second images.

* * * * *